United States Patent [19]

Nakano et al.

[11] Patent Number: 4,734,558

[45] Date of Patent: Mar. 29, 1988

[54] LASER MACHINING APPARATUS WITH CONTROLLABLE MASK

[75] Inventors: Masakazu Nakano; Yoihi Yoshino, both of Tokyo, Japan

[73] Assignee: NEC Corporation, Japan

[21] Appl. No.: 610,342

[22] Filed: May 14, 1984

[30] Foreign Application Priority Data

May 16, 1983 [JP] Japan .................................. 58-85268
Jul. 25, 1983 [JP] Japan ................................ 58-135554

[51] Int. Cl.$^4$ .............................................. B23K 26/00
[52] U.S. Cl. ....................... 219/121 LP; 219/121 LA; 350/334
[58] Field of Search ...... 219/121 LP, 121 L, 121 LQ, 219/121 LR, 121 LA; 350/351, 387, 342, 344, 334

[56] References Cited

U.S. PATENT DOCUMENTS

| | | | |
|---|---|---|---|
| 3,292,102 | 12/1966 | Byrne | 219/121 LP |
| 3,440,388 | 4/1969 | Otstot et al. | 219/121 LP X |
| 3,971,931 | 7/1976 | Jehle | 350/342 X |
| 3,975,082 | 8/1976 | Winzer | 350/387 X |
| 4,013,466 | 3/1977 | Klaiber | 350/351 X |
| 4,032,861 | 6/1977 | Rothrock | 219/121 LP X |
| 4,156,124 | 5/1979 | MacKen et al. | 219/121 LP X |
| 4,219,721 | 8/1980 | Kamen et al. | 219/121 LR |
| 4,323,317 | 4/1982 | Hasegawa | 219/121 LP X |

Primary Examiner—Philip H. Leung
Attorney, Agent, or Firm—Ostrolenk, Faber, Gerb & Soffen

[57] ABSTRACT

A laser machining apparatus is disclosed. The laser machining apparatus includes a marking table, a laser, a first optical system for converting a laser beam emanating from the laser into a parallel beam, a device for generating a transparent optical aperture by controlling an optical material in either an electrical or an optical manner, a device for directing the parallel beam output from the first optical system toward the optical aperture, and a second optical path for focusing the optical aperture on a sample which is located on the marking table.

13 Claims, 13 Drawing Figures

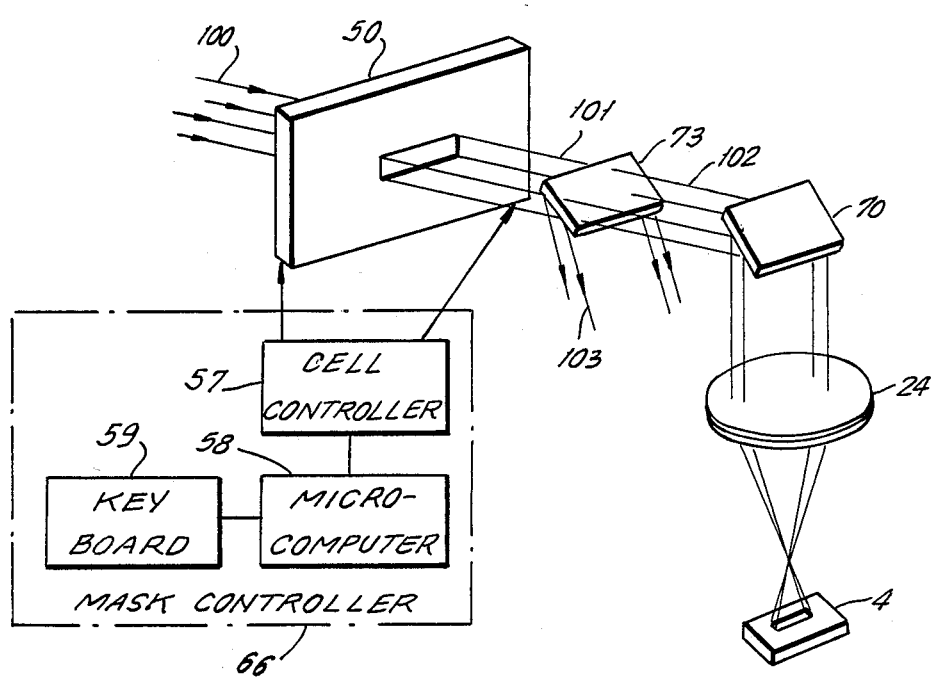
_FIG. 6_
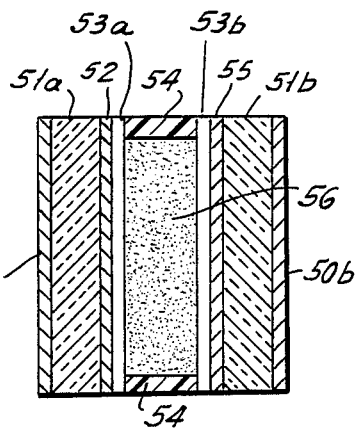
_FIG. 7_

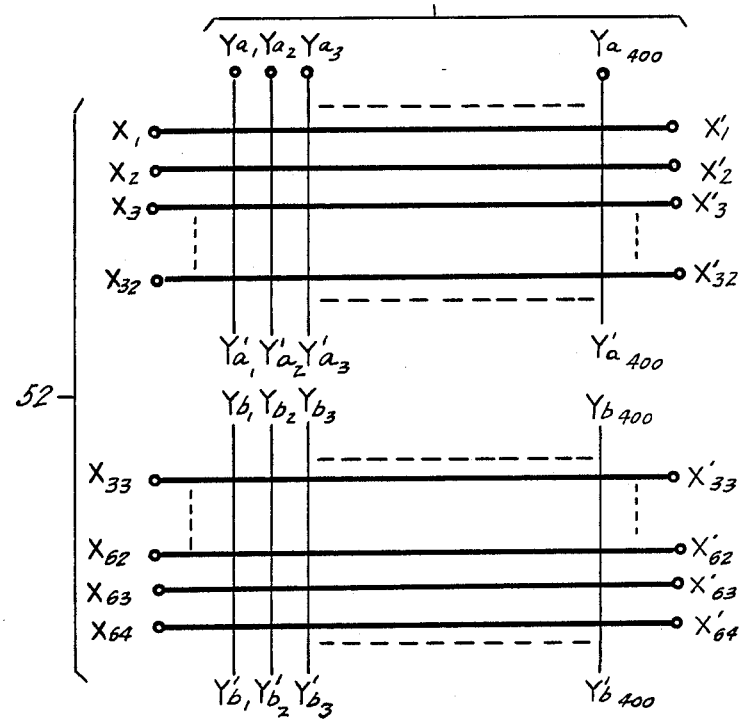
FIG. 8.
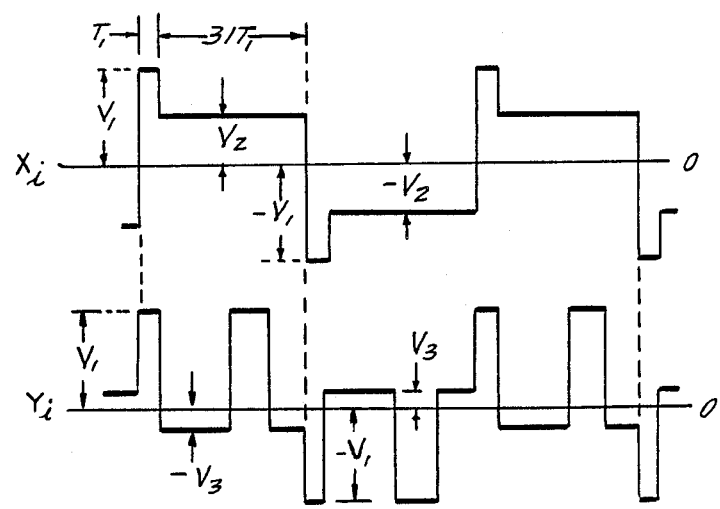
FIG. 9A.
FIG. 9B.

LASER MACHINING APPARATUS WITH CONTROLLABLE MASK

BACKGROUND OF THE INVENTION

The present invention relates to a laser machining apparatus and, more particularly, to a laser machining apparatus of the type using a mask generator which predetermines a shape to be produced by a laser beam.

Generally, a laser machining apparatus comprises a laser for emitting a laser beam having a high energy density, an optical system for projecting the laser beam onto a workpiece in a desired shape, and a work table movable to cause the shaped laser beam to impinge on a desired point of the workpiece.

It has been customary in this type of laser machining apparatus to use the laser beam without any modification or after passing it through a mask, which may be prepared by punching a metal sheet to form an aperture or a slit representative of a symbol and/or a character pattern, to set up a specific configuration for illumination. For example, in an ordinary laser machining apparatus such as a laser repairer or a scriber, use is made of a mask generator having an aperture whose width is mechanically variable or a mask generator which is a combination of metal plates formed with rectangular and circular apertures. The former, for example, is described in an article entitled "Laser Application to Metal-Photo-Mask Repair" by Shogo Yoshikawa and Ryuji Tatsumi, appearing in TECNOCRAT, Vol. 12, No. 2, pages 1–5, Feb. 1979. In this article, an aperture formed in a mask generator is disposed in the path of a laser beam to shape or restrict the laser beam. The so restricted laser beam, or an image of the aperture, is focused by an object lens onto the surface of a workpiece.

A laser machining apparatus generally called a "marker" has been marketed which uses the above-described imaging system and scribes numerals, characters and symbols utilizing at least a single laser beam illumination. A mask generator employed with such a marker comprises metal plates which are punched in to shape of various kinds of numerals and characters, the metal plates being combined to scribe various kinds of inscription. The drawback encountered with such a marker is that various kinds of inscriptions are unattainable unless the marker is furnished with a large number of masks. Another drawback is that the metal plate has to be replaced with another by an awkward procedure every time the inscription is changed and, moreover, replacing the metal plate by hand is dangerous due to the use of a high output laser. Additionally, mask replacement requires the production line to be halted, resulting in reduced throughput.

SUMMARY OF THE INVENTION

It is therefore an object of the present invention to provide a laser machining apparatus which uses a mask generator instead of the metal masks or slits so as to eliminate the danger heretofore experienced in the event of mask replacement.

It is another object of the present invention to provide a laser machining apparatus which allows an aperture to be generated or changed in a short time and with ease.

In accordance with the present invention, there is provided a laser machining apparatus which comprises a marking table, a laser, a first optical system for converting a laser beam emanating from said laser into a parallel beam, a device for generating a transparent optical aperture by controlling an optical material in either an electrical or optical manner, a device for directing the parallel beam output from the first optical system toward the optical aperture, and a second optical system for focusing the optical aperture on a sample which is located on the marking table.

The optical aperture generating device comprises a liquid crystal light valve or a Bismuth.Silica.Oxide ($Bi_{12}SiO_{20}$) light valve so that an optical aperture may be generated in a liquid crystal or a $Bi_{12}SiO_{20}$ monocrystal.

For the liquid crystal light valve, use is made of a nematic-cholesteric phase transition type liquid crystal and the orientation of the liquid crystal molecules is changed by means of an electric field. A change in the orientation of liquid crystal molecules results in a difference in plane of polarization between laser light transmitted through a portion of the liquid crystal to which the electric field is applied and laser light transmitted through a portion to which the electric field is not applied. Therefore, if an optical aperture is matched either with the portion of the liquid crystal effected by the field or with the portion not effected thereby and the laser light passed through the aperture is picked up by a polarizing element, the light emanating from the polarizing element will have a desired configuration and, therefore, provide a desired machining pattern when condensed onto a sample.

To generate an aperture, a matrix electrode or a cadmium sulfide photosensor layer is formed in a liquid crystal light valve and controlled from outside the optical system by electrode drive or optical write-in.

As for a $Bi_{12}SiO_{20}$ light valve, utilizing the fact that a $Bi_{12}SiO_{20}$ monocrystal develops double refraction when applied with a voltage, and that it shows high sensitivity to blue light while the blue light functions to cancel the double refraction state, an optical aperture is formed in the monocrystal by applying a voltage thereto from a matrix electrode or illuminating it with blue light.

Since the generation or the change of an aperture associated with a desired pattern is controlled from outside a laser path as described above, the operation is free from danger and various apertures can be readily formed within a short period of time.

BRIEF DESCRIPTION OF THE DRAWING

FIG. 6 is a fragmentary perspective view of a fourth embodiment of the present invention;

FIG. 7 is a section of a liquid crystal light valve applicable to the fourth embodiment shown in FIG. 6;

FIG. 8 is a schematic view of a matrix electrode built in the light valve shown in FIG. 7;

FIGS. 9A and 9B are waveform diagrams representative of signals applied to the matrix electrode of FIG. 8;

DESCRIPTION OF THE PREFERRED EMBODIMENTS

Preferred embodiments of the present invention will now be described in detail with reference to the accompanying drawings.

Figure 1:
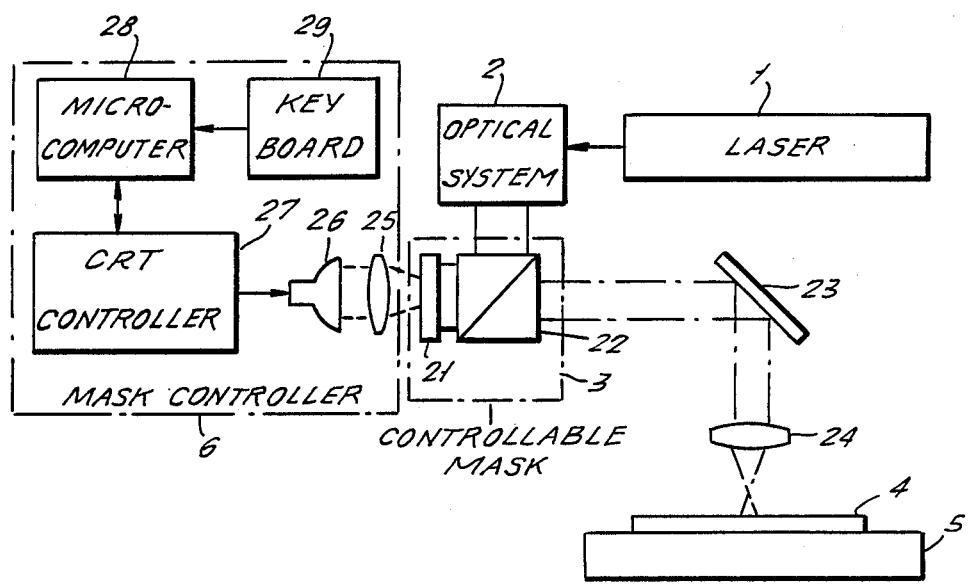
FIG. 1 is a block diagram of a laser machining apparatus of a first embodiment of the present invention.

Referring to FIG. 1, a laser machining apparatus in accordance with a first embodiment of the present invention is shown. The laser machining apparatus includes a Nd:YAG laser 1, an optical system 2, a controllable mask device 3, a mask controller 6, a mirror 23, an imaging optical system 24, and a marking table 5. The laser 1 emits linearly polarized pulse laser light whose intensity is about 1 J/pulse. The optical system 2 reflects and expands the output light of the laser 1 to form a parallel beam. The controllable mask device 3 includes a beam-addressed liquid crystal light valve 21 and a polarizing beam splitter or polarizing prism 22. Controlled by light emanating from the mask controller 6, the mask device 3 forms a transparent optical aperture in the liquid crystal light valve 21 so that the opticl aperture, in combination with the beam splitter 22, masks the laser light. The beam splitter 22 is reflective for a linearly polarized component of the light output from the optical system 2, and transparent for a light component perpendicular to the linearly polarized component.

The mask controller 6 functions to develop an optical image for generating an aperture in the light valve 21 and includes a cathode ray tube (CRT) 26, a CRT controller 27, a microcomputer 28, a keyboard 29, and a lens 25. When any desired character key, a numeral key or a symbol key on the keyboard 29 is depressed, the microcomputer 28 performs a necessary processing to deliver to the CRT controller 27 a control signal and data associated with the depressed key. The CRT controller 27 generates signals for displaying the data on the CRT 26 and supplies them to the CRT 26. The CRT 26 displays the character, numeral or symbol thereon and such a visual image is focused by the lens 25 onto the light valve 21. The imaging system 24 forms the image of the aperture formed in the light valve 21 onto a sample 4 which is located on the marking table 5.

Figure 3:
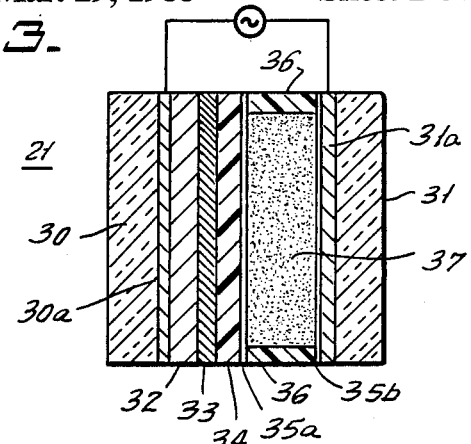
FIG. 3 is a section of a liquid light valve applicable to the embodiment of FIG. 1.

As shown in FIG. 3, the liquid crystal light valve 21 comprises a glass substrate 30, a transparent conductive electrode 30a, a cadmium sulfide (CdS) photoconductive film 32 formed on the electrode 30a by depositing argon-base hydrogen sulfide by a reactive sputtering process, a light intercepting film 33 formed on the photoconductive film 32 by sputtering tellurium sulfide, a multi-layer dielectric mirror layer 34, liquid crystal orienting layers 35a and 35b each comprising a obliquely-deposited silicon oxide layer or the like and orienting liquid crystal molecules along and parallel to its surface, spacers 36, a glass substrate 31 having a transparent conductive electrode 31a on its surface, and a liquid crystal 37 filling the space which is defined by the orienting layers 35a and 35b and the spacers 36. The liquid crystal cell is arranged such that the laser beam becomes incident thereto at the glass substrate 31 and the direction of orientation of the orienting layer 35b coincides with the polarizing direction of the incident laser beam.

The light intercepting film 33 serves to intercept laser light so that when laser light having a wavelength to which the film 32 is sensitive is directed for machining from the beam splitter 22 to the glass substrate 31, the photoconductive film 32 may be prevented from being exposed to the laser light.

The beam-addressed liquid crystal light valve mentioned above is described in an article entitled, "ac liquid-crystal light valve" by T. D. Beard, W. P. Bleha, and S. -Y Wong, appearing in Applied Physics Letters, Vol. 22, No. 3, pages 90–92, Feb. 1973, and "The Use of the Hybrid Field Effect Mode Liquid Crystal Light Valve with Visible Spectrum Projection Light" by William P. Belha, Jan Grinberg, Alexander D. Jacobson and Gray D. Myer, appearing in International Symposium Digest of Technical Papers, Vol. VIII, pages 104–105, 1977.

The liquid crystal 37 comprises a twisted nematic liquid crystal, such as so-called E7, in which the orientation of the liquid crystal molecules is twisted 45 degrees between the orienting layers 35a and 35b. When no electric field is applied to the liquid crystal 37, laser light polarized in the direction of arrangement of the liquid crystal molecules which are oriented by the layer 35b is caused to rotate its plane of polarization 45 degrees before reaching the other layer 35a, thereby turning into circular polarized light. The circular polarized light is reflected by the mirror layer 34 and, while propagating through the liquid crystal 37 toward the layer 35b, its plane of polarization is further rotated 45 degrees. Therefore, the liquid crystal cell 37 serves to optically rotate the plane of polarization 90 degrees so that laser light incident to the liquid crystal cell and then reflected to return to a polarizing prism is allowed to pass through the prism. When an electric field having a greater intensity than a predetermined level is applied to the liquid crystal 37, the liquid crystal molecules are reoriented in the direction of the electric field to lose the foregoing optical property and, thereby, become transparent.

To generate an optical aperture in the liquid crystal light valve 21, the screen of the CRT 26 is caused to glow, and an AC voltage is applied across the transparent electrodes 30a and 31a. In the illustrative embodiment, the light valve 21 generates an optical aperture which matches the shape of the area of the CRT screen which is not glowing.

The image displayed on the CRT 26 is reduced by the lens 25 to a size on the order of ½ to 1/5 of the original size and focused on the CdS photoconductive film 32 via the lens 25. Since the resistance of the film 32 remains high in the area which is not exposed to the light, hardly any electric field is applied to the liquid crystal 37 in that area. Meanwhile, the area of the film 32 exposed to the light is lowered in resistance so that the ac field is applied to the liquid crystal 37 in the exposed area. As a result of this construction, when the laser light from the polarizing beam splitter 22 is incident to that part of the liquid crystal 37 which corresponds to the glowing part of the CRT 26, it is emitted from the liquid crystal light valve 21 without changing its plane of polarization and is then reflected by the beam splitter 22. In the meantime, as the laser light becomes incident to that part of the liquid crystal which corresponds to the non-glowing part of the CRT 26, its plane of polarization is rotated 90 degrees to be transmitted through the beam splitter 22. That is, the illuminated part of the liquid crystal 37 serves as a mask while the non-illuminated part serves as an optical aperture for the laser light. The laser light transmitted through the beam splitter 22 is projected by the object lens 24 onto the sample 4.

In the first embodiment of the present invention, which the sample 4 is conveyed together with the marking table 4 which is driven by a belt conveyor, a picture is displayed on the CRT 26 or a displayed picture is changed in order to write the image in the beam-addressed liquid crystal light valve 21. As soon as the sample 4 arrives at a predetermined position beneath the object lens 24, the movement of the belt conveyor is stopped and, then, the laser 1 is actuated to emit laser light.

As described above, in the illustrative embodiment, a picture of characters, figures and the like in desired numbers and sizes is displayed on the CRT 26, the many images are focused at once to the liquid crystal light valve 21 to form optical apertures in inverted positions of the images in the picture on the light valve 21, and laser light passed through the apertures is projected onto the sample 4. Such a procedure insures efficient laser machining.

In the embodiment described above, the means for displaying characters, figures and other pictures on the screen of the CRT 26 may be constructed such that, with the CRT screen converted into coordinates in advance, a picture to be displayed is written in a memory as position data in terms of the coordinates and such position data are read out of the memory to be displayed on the CRT 26. It is preferable then to write position data representative of a plurality of pictures so that they may be selectively read out by a selector or a decoder.

Figure 2:
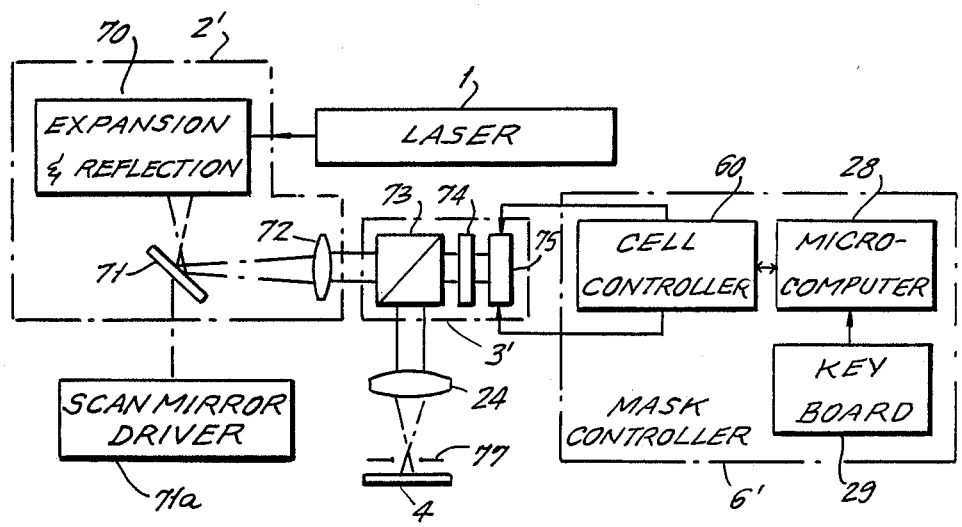
FIG. 2 is a block diagram of a second embodiment of the present invention.

Referring to FIG. 2, a second embodiment of a laser machining device of the present invention is shown which also uses a Nd:YAG laser 1. The device includes an optical system 2' which includes a beam reflection and expansion device 70, a beam scan mirror 71 and a collimator lens 72 and functions to reflect and expand the laser light and, then, collimate it. A controllable mask device 3' includes a polarizing prism 73, a ¼ wavelength plate 74, and a thermal write-in type liquid crystal light valve 75 which is driven by a matrix electrode drive system. The device 3' is adapted to mask the laser light emitted from the optical system 2' by means of an optical aperture which is generated in the light valve 75. A mask controller 6' includes a cell controller 60, a microcomputer 28 and a keyboard 29. The cell controller 60 in turn includes a matrix electrode drive circuit which generates an aperture in the light valve 75 in response to control signal data fed thereto from the microcomputer 28. The lens 24 restricts a machining laser beam emanating from the mask device 3' and having a desired section, thereby illuminating the sample 4 via the aperture.

Figure 5:
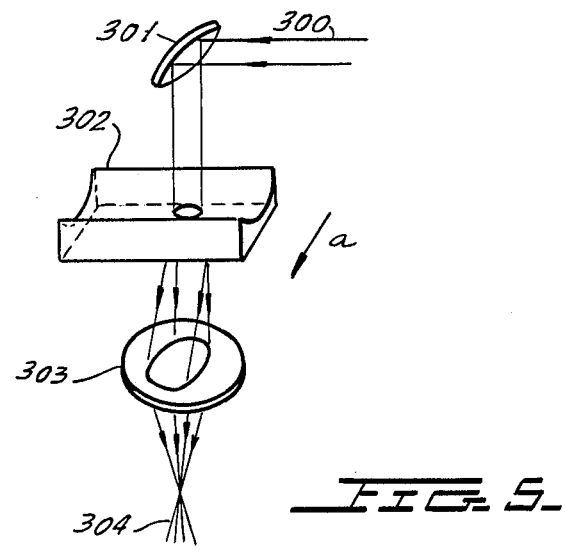
FIG. 5 is a perspective view of an expansion and reflection device installed in the embodiment of FIG. 2.

As shown in FIG. 5, the beam reflection and expansion optical system 70 is constructed to reflect the linearly polarized laser beam output from the laser 1 to redirect it, and then expand the laser beam to shape it into a rectangular beam. The laser beam 300 emitted from the laser 1 is reflected by a mirror 301 and, then, expanded by a concave cylindrical lens 302 which has an elliptical upper surface and a flat lower surface. The laser beam is greatly expanded by the lens 302 in a direction indicated by an arrow a, which is parallel to the transverse direction of the light valve 75, and thereafter condensed by a convex lens 303. The condensed laser beam 304 is reflected by the beam scan mirror 71 to illuminate a desired position of the collimator lens 72, in which the beam is collimated and is directed perpendicular to the surface of the light valve 75. The light incident on the surface of the light valve 75 is in the form of a substantially rectangular beam which has a transverse width substantially equal to that of the liquid crystal surface and a vertical width smaller than that of the liquid crystal surface. The partial illumination of the liquid crystal surface by the laser beam is ensured to prevent the power density of the laser beam incident to the light valve 75 from being lowered very much and, also, to concentrating the beam to an area where an optical aperture is to be formed. In the case where the optical aperture is larger in sectional area than the incident beam, the beam scan mirror 71 may be moved by a scan mirror driver 71a to shift the beam in the longitudinal direction of the light valve 75. The laser beam collimated by the collimator lens 72 is transmitted through the prism 73 and, then, turned into a circular polarized light by the ¼ wavelength plate 74.

Figure 4A:
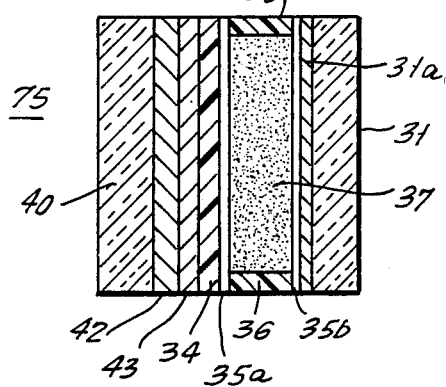
FIG. 4A is a section of a liquid crystal light valve applicable to the embodiment of FIG. 2.

In the illustrative embodiment, the liquid crystal light valve 75 has a structure shown in FIG. 4A. The structure shown in FIG. 4A differs from the one shown in FIG. 3 in that it employs a glass substrate 40 in place of one 30 of the opposite substrates and the transparent electrode 30a, and a matrix electrode made up of 200 to 300 chromium-gold electrodes 42 which replace the photoconductive film 32 and about 100 chromium-gold electrodes 43 which replace the light intercepting film 33, while using octyl-cyano-biphenyl (OCBP) as the liquid crystal material. The chromium-gold electrodes 42 are 185 microns wide and arranged at a pitch of the order of 185 microns in the transverse direction of the substrate 40, while the chromium-gold electrodes 43 are arranged at the same pitch as above-mentioned in the vertical direction of the substrate 40.

OCBP is a cholesteric liquid crystal whose dielectric anisotropy is negative and which scatters light depending upon temperature. Under a usual or normal condition, screw axes of the cholesteric liquid crystal are oriented perpendicularly to the planes of the orientation layers 35a and 35b, so that the liquid crystal remains transparent. However, when heated and then cooled beyond a certain temperature, the screw axes of the cholesteric liquid crystal are made random in orientation rendering the liquid crystal non-transparent. Light incident to the liquid crystal in the non-transparent state is scattered.

Thermal cycling activity in this type of the liquid crystal is described, for example, in an article entitled, "Thermal cycling activates, 'freezes' liquid-crystal display" by Roderic Beresford, Components Editor, appearing in Electronics, pages 39-40, Nov. 30, 1981.

In this embodiment, the cell controller 60 causes a current to flow through the points where the vertical electrodes 43 and the transverse electrodes 42 of the matrix electrode intersect each other, and the resulting heat is applied to the liquid crystal 37 to develop a spatial heat distribution in the liquid crystal. As soon as the current supply to the intersections of the electrodes 43 and 42 is interrupted, the liquid crystal is cooled off developing a scattered light state in those areas where the heat distribution existed. As to the method of current supply, the transverse electrodes 42 are sequentially scanned one at a time from the uppermost one to apply a drive signal thereto. While any of the transverse electrodes 42 is supplied with a drive signal, the vertical electrodes intersecting the transverse electrode 42 are simultaneously supplied with pulse signals representative of position data associated with the intersections, thereby generating optical changes on the single transverse electrode 42. Such line-sequential scanning is performed once for each transverse electrode line so as to develop in the matrix electrode those intersections where a current flows and those where a current does not flow. The liquid crystal 37 defines an optical aperture in its portions which face all the intersections where a current does not flow, maintaining the transparent state. Therefore, the laser beam emanating from the orienting layer 35b is reflected by the mirror layer 34 to propagate backward through the optical path which it propagated before. Meanwhile, the laser light incident to those portions of the liquid crystal 37 which face the intersections where a current flow is scattered. This scattered light condition lasts a long period of time. To cancel the scattered light condition, all that is required is to apply a voltage across the transparent electrode 35b and the transverse electrodes 42 or the vertical electrodes 43. The laser beam reflected by the mirror layer 34 is transmitted through the ¼ wavelength plate 74 to produce linearly polarized light. This linear polarization is perpendicular to the polarization of the laser beam which is incident from the polarizing prism 73 to the ¼ wavelength plate 74. The prism 73 reflects the linearly polarized laser beam toward the machining lens 24. Consequently, the laser beam condensed by the machining lens 24 has a desired configuration. The aperture 77 serves to intercept undesirable scattered light from the light valve 75 which is contained in the laser beam, thereby increasing the contrast of the machining laser beam on the sample 4.

The power necessary for thermal write-in in the light valve 75 is about 0.6 joules per square centimeter of the intersections of the matrix electrode and the write-in time per one electrode line is less than about 1 millisecond. For example, the write-in time per 200 electrode lines is less than 200 milliseconds. This means that, in the event of laser machining workpieces while changing the aperture, it is sufficiently practical to perform write-in while the sample 4 is being moved by the belt conveyor. Hence, the write-in time for the light valve 75 is no problem for laser machining.

In the second embodiment described above, the laser 1 will emit laser light when an aperture is completed in the light valve 75.

Concerning a liquid crystal light valve of the type using a matrix electrode, it is possible to design the width of an electrode 50 microns to several hundreds of microns and the dimension of the gap between adjacent electrodes 10 microns to several tens of microns. It follows that, when a rectangular laser beam one width of which is 20–50 millimeters is projected onto a liquid crystal surface, several hundreds of resolving points are achieved within that width. Making an inscription by reducing the above-mentioned dimension to 3–10 millimeters provides a sufficiently high resolution. At this instant, assuming that the other width of the rectangular beam incident on the liquid crystal is 15–30 millimeters, the laser power density on the crystalline structure can be suppressed to below 200 millijoules per square centimeter, which is low enough to prevent damage to the light valve. The laser power density at the focal point is higher than about 0.6 joules per square centimeter, promoting desirable simultaneous inscription.

In the manner described, any of the first and second embodiments of the present invention is capable of scribing several desired patterns at once by laser beam illumination while preventing the laser beam from damaging the liquid crystal light valve.

In accordance with the present invention, various kinds of liquid crystal light valves may be used as the mask generator for laser machining other than those employed with the first and second embodiments.

Figure 4B:
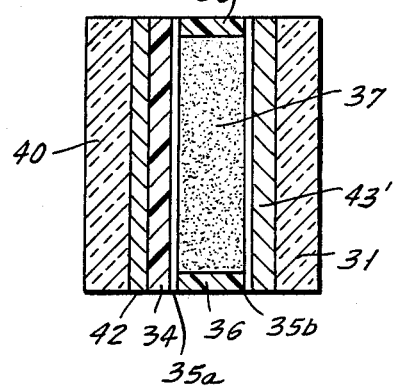
FIG. 4B is a section of a liquid crystal light valve applicable to a third embodiment of the present invention.

Referring to FIG. 4B, a liquid crystal light valve for use in a third embodiment of the present invention is shown. The light valve is used in FIG. 2 in place of the light valve described with respect to the second embodiment. In FIG. 4B, the chromium-gold transverse electrodes 42 are held between the glass substrate 40 and the dielectric multi-layer film 34, while vertical transparent electrodes 43' are held between the orienting layer 35b and the glass substrate 31. The electrode assembly 42 is positioned to the left of the liquid crystal 37, and the electrode assembly 43' to the right of the same. The orienting layers 35a and 35b which are processed for vertical orientation sandwich the liquid crystal 37 therebetween. Use is made of a P-type cholesteric liquid crystal as the liquid crystal 37.

While an electric field is absent, a P-type cholesteric liquid crystal is in a focalconic structure and presents a milk-white opaque appearance. When the transverse and vertical electrodes are driven by line-sequential scanning as in the second embodiment so as to apply a field of greater intensity than a certain reference value, molecules of the liquid crystal are oriented in the direction of the field to set up a nematic state, in which the liquid crystal is transparent.

As a result, that part of the liquid crystal to which the field is applied defines an optical aperture. Laser light transmitted through the optical aperture and then reflected by the dielectric mirror 34 is projected onto the sample as a beam having a desired shape. The rest of the laser light which is incident to the part of the liquid crystal left out of the field is scattered.

In place of the liquid crystal light valve, the one dispensed with the dielectric multi-layer film 34 may be used. In this case, the valve, should be arranged in the beam path because it functions as a transmission type light valve.

A fourth embodiment of the present invention is shown in FIG. 6. In the drawing, the reference numeral 100 designates linearly polarized laser light which is emitted from a Nd:YAG laser, expanded, and then transformed into a rectangular beam. A liquid crystal light valve 50 and a polarizing element 73 constitute in cooperation a mask device which generates an optical aperture in a desired shape so as to provide a machining laser beam having a desired sectional configuration. A cell controller 57 includes a matrix electrode driving circuit. A microcomputer 58 serves as a source of information supply for generating an aperture. A mirror 70 is adapted to change the optical path by 90 degrees. Designated by the reference numeral 24 is a lens.

As shown in FIG. 7, the liquid crystal light valve 50 includes a liquid crystal 56 which is a mixture crystal cell in a twisted nematic mode. The liquid crystal 56 is held between orienting layers 53a and 53b and spacers 54. Deposited on the outer surfaces of the orienting layers 53a and 53b are respectively transparent conductive electrodes 52 and 55. The electrodes 52 are transverse electrodes which are formed on the inner surface of a glass substrate 51a, while the electrodes 55 are vertical electrodes which are formed on the inner surface of a glass substrate 51b. Anti-reflection films 50a and 50b are deposited respectively on the outer surfaces of the glass substrates 51a and 51b in order to prevent reflection of laser light.

The orienting layer 53a is treated such that the molecules of the liquid crystal 56 are uniaxially oriented along the polarization of the linearly polarized laser beam 100. The orienting layer 53b, on the other hand, is treated in such a manner as to orient the liquid crystal molecules perpendicular to the orientation of those molecules on the orientation layer 53a.

The liquid crystal 56 which is in a twisted nematic mode twists its molecular axis 90 degrees between the orientation layers 53a an 53b so long as an electric field is absent, thereby rotating the plane of polarization of the incident light 90 degrees. Upon application of an electric field to the liquid crystal, the molecules of the liquid crystal fall in an orientation which is parallel to the direction of the field so that laser light parallel to the field is transmitted through the liquid crystal 30 without being polarized. To develop the electric field, a current is fed through the transverse electrodes 52 and the vertical electrodes 55 so that a potential difference may be developed in the liquid crystal 30 between the electrodes 52 and 55.

FIG. 8 is a schematic diagram representative of a construction of the transverse electrodes 52 ($X_1$-$X'_1$, $X_2$-$X'_2$, ..., $X_{64}$-$X'_{64}$) and the vertical electrodes 55 ($Ya_1$-$Y'a_1$, $Ya_2$-$Y'a_2$, ... $Ya_{400}$-$Y'a_{400}$, $Yb_1$-$Y'b_1$, $Y'b_2$-$Yb_2$, ..., $Yb_{400}$-$Y'b_{400}$). 64 transverse electrodes 52 are arranged at a pitch of 0.2 millimeter, while the vertical electrodes 55 are arranged at a pitch of 0.2 millimeters. The vertical electrodes 55 are divided into two groups such that the upper 400 vertical electrode lines individually intersect the transverse electrodes $X_1$-$X'_1$, ..., $X_{32}$-$X'_{32}$, and the lower 400 vertical electrode lines individually intersect the transverse electrodes $X_{33}$-$X'_{33}$, ..., $X_{64}$-$X'_{64}$.

The matrix electrode is driven by a transverse electrode drive signal and a vertical electrode drive signal which are supplied from the cell controller 57.

The transverse electrode drive signal is an ac signal shown in FIG. 9A. This ac signal develops a drive voltage $V_1$ or $-V_1$ duration of $T_1$ second between leading and trailing edges and, for the other period of $31T_1$ seconds, a voltage $V_2$ or $-V_2$. The voltage $V_2$ is applied to achieve better responce of the liquid crystal. Here, assuming that the threshold voltage at which the orientation of the molecules of the liquid crystal 56 changes is $V_E$, the voltages $V_1$ and $V_2$ are held in a relation $V_2 < V_E < V_1$; the liquid crystal does not responding to the voltage $V_2$. First, the transverse electrode drive signal is applied at the same time to the transverse electrodes $X_1$-$X'_1$ and $X_{64}$-$X'_{64}$ and, after $T_1$ second, to the transverse electrodes $X_2$-$X'_2$ and $X_{63}$-$X'_{63}$ and, after another $T_1$ second, to the transverse electrodes $X_3$-$X'_3$ and $X_{62}$-$X'_{62}$. Such scanning is effected sequentially over the transverse electrodes until the transverse electrodes $X_{32}$-$X'_{32}$ and $X_{33}$-$X'_{33}$ receive the transverse electrode drive signal upon the lapse of $31T_1$ seconds after the initial scan. In this manner, the transverse electrodes to which the voltage $V_1$ is applied sequentially shift at every $T_1$ seconds from the top and bottom toward the center of the matrix.

The vertical electrode drive signal is applied at once to all the vertical electrodes which intersect the transverse electrodes being applied with the voltage $V_1$. Depending upon the vertical electrode drive signal, the orientation of the molecules of the liquid crystal is changed. FIG. 9B shows an example of the vertical electrode drive signal which is applied to a certain vertical electrode $Y_i$. As shown, the vertical electrode drive signal is a signal having a voltage $V_1$ ($-V_1$) or a voltage $V_3$ ($-V_3$). The voltage $V_3$ is lower than the threshold voltage $V_E$. While the voltage $V_1$ ($-V_1$) is applied to a certain transverse electrode $X_i$, the voltage $V_1$ ($-V_1$) or $V_3$ ($-V_3$) is applied to the vertical electrodes. Then, the potential difference developing in the liquid crystal between the transverse electrode $X_i$ and the vertical electrode $Y_i$ is zero or ($V_1+V_3$). When the potential difference is ($V_1+V_3$), the molecules of the liquid crystal are oriented parallel along the electric field. The voltage $V_2$ ($-V_2$) is applied to the transverse electrodes other than the electrode $X_i$ being applied with the voltage $V_1$; the potential difference developing in the liquid crystal between such transverse electrodes and the vertical electrodes is ($V_1-V_2$) or ($V_2+V_3$). The voltages $V_1$, $V_2$ and $V_3$ are suitably selected so that an electric field resulting from the potential difference may be prevented from greatly changing the orientation of the molecules of the liquid crystal.

The relation between the characteristics of twisted nematic liquid crystal and the voltage to apply to the liquid crystal is described, for example, in an article entitled, "Constrast Optimization in Matrix-Addressed Liquid Crystal Displays" by J. E. Bigelow, R. A. Kashnow, and C. R. Stein, appearing in IEEE Transactions on Electron Devices, pages 22–24, Jan. 1975.

The microcomputer 58 generates a control signal for setting a waveform of the vertical electrode drive signal output from the cell controller 57, based on an optical aperture to be defined by the liquid crystal.

In FIG. 6, the laser beam 100 is transmitted through the liquid crystal 56 of the light valve 50 to be transferred into a laser beam 101. Assuming that the polarized light of the laser beam 100 is a p-wave, that part of the laser beam 101 transmitted through a portion of the light valve 50 which is not applied with the voltage ($V_1+V_3$) has its plane of polarization rotated 90 degrees to become an s-wave is directed by the polarizing and separating element 73 toward the outside of the marking optical system in the optical path 103. Meanwhile, the other part of the laser beam 101 transmitted through the other portion of the liquid crystal 30 which is applied with the voltage ($V_1+V_3$) is transmitted in the form of the p-wave through the polarizing element 60 to propagate through an optical path 102. The p-wave in the optical path 102 is reflected by the mirror 70 toward the lens 80 so as to illuminate the sample 4. In the application to the sample having the surface layer made of an ordinary plastic mold material, the sample is heated into a depth of about 5–20 microns by the laser beam to evaporate the mold material, thus rugged surfaces of the plastics being formed.

In the illustrative embodiment, two liquid crystal light valves 50 having the described structure may be disposed in the optical path for the laser beam. Further, a stensile mask or a glass substrate having a patterned metal film deposited thereon may be located in the optical path in combination with such a liquid crystal light valve.

While each of the four embodiments shown and described has employed a liquid crystal light valve as a mask generator for generating an optical aperture, any other type of light valve is applicable to the present invention.

Figure 10:
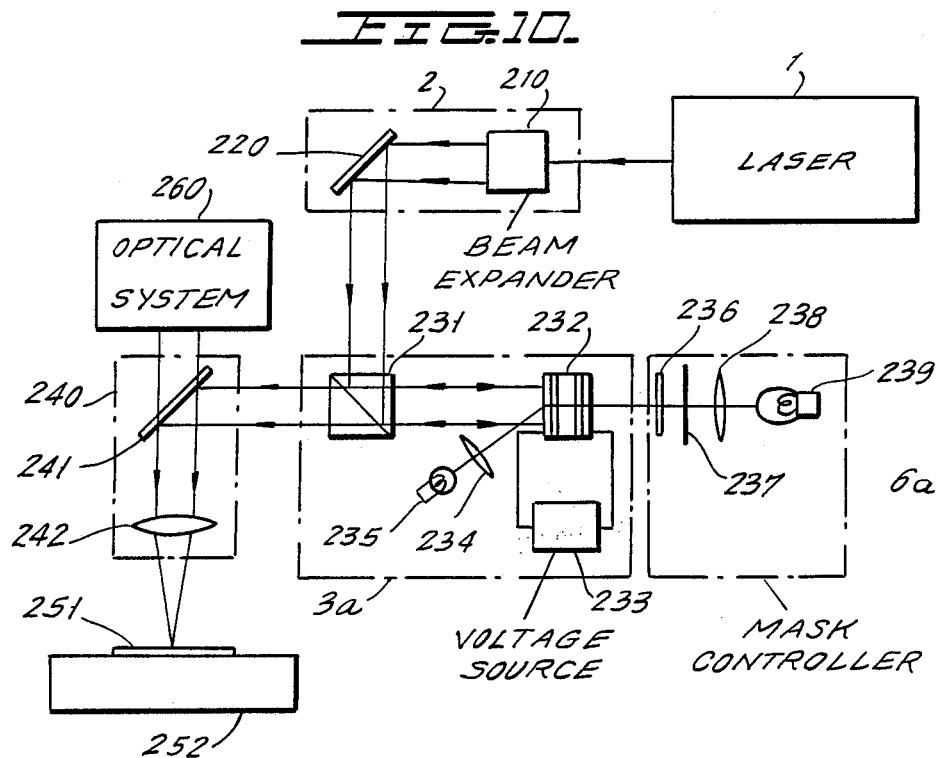
FIG. 10 is a block diagram of a fifth embodiment of the present invention.

Referring to FIG. 10, a fifth embodiment of the present invention is shown. In FIG. 10, a laser beam emitted from the laser 1 is incident to the optical system 2 which includes a beam expander 210 therein. After being expanded by the beam expander 210, the laser beam is reflected by a mirror 220 toward a polarizing beam splitter 231. The beam splitter 231 serves to allow only a specific linearly polarized component to reach a Bismuth.Silica.Oxide ($Bi_{12}SiO_{20}$)light valve 232. Assume that the $Bi_{12}SiO_{20}$ light valve 232 has been formed with an optical aperture having a desired configuration. The laser beam spatially modulated by the light valve 232 is reflected by a reflecting film in the light valve 232 to become incident to the beam splitter 231. The laser beam transmitted through the beam splitter 231 has a section which is idential with the optical aperture in the light valve 232. This laser beam is reflected by a dichroic mirror 241 in a condensing optical system 240 and, then, condensed by a condenser lens 242 to illuminate a sample 251. The lens 242 functions to focus the aperture in the light valve 232 to the sample 251. The sample 251 is laid on a three-dimensionally movable marking table 252 to be thereby positioned as desired. The reference numeral 260 designates an optical system which allows one to observe the surface of the sample 251.

Figure 11:
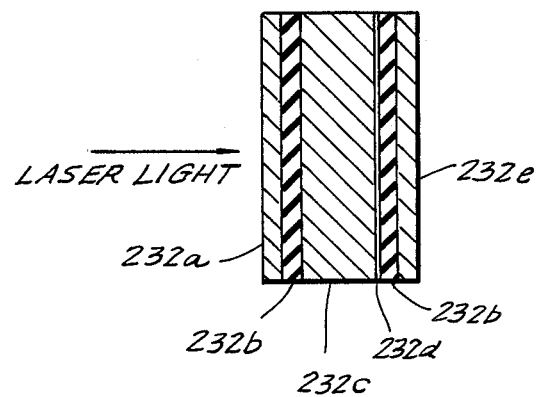
FIG. 11 is a section of a $Bi_{12}SiO_{20}$ light valve applicable to the embodiment of FIG. 10.

A $Bi_{12}SiO_{20}$ light valve is an optical information transforming device which is usually used for optical data processings. The $Bi_{12}SiO_{20}$ light valve 232 used in the embodiment is of the reflection read-out type which is driven by a matrix electrode. As shown in FIG. 11, the light valve 232 comprises a $Bi_{12}SiO_{20}$ monocrystal 232c which has a dielectric mirror 232d deposited on one surface thereof. A pair of insulating layers 232b each made of parillen hold the monocrystal 232c therebetween. A flat transparent electrode 232a is formed on one of the insulating layers 232b, and a flat transparent electrode 232e on the other insulating layer 232b.

To form an aperture in the light valve 232, before directing laser light thereto, a voltage source 233 is actuated to apply a ground level voltage to the transparent electrode 232a and a voltage of several kilovolts to the transparent electrode 232e. This develops an electrooptical effect in the $Bi_{12}SiO_{20}$ monocrystal 232c, setting up a double refraction state. Such a state is maintained for a long period of time even after interruption of the voltage supply. The voltages applied to the transparent electrodes 232a and 232e are so selected as to cause the plane of polarization of laser light incident to the $Bi_{12}SiO_{20}$ monocrystal to rotate 90 degrees while the laser light reciprocates through the crystal. After the application of the voltages is interrupted, a mercury lamp 239 installed in a mask controller 6a is turned on and a shutter 237 is opened. The resulting light from the mercury lamp 239 illuminates a filter 236 via a lens 238. The filter 236 allows only the blue component of the incident light to pass therethrough so that the blue light becomes incident to the light valve 232. That part of the $Bi_{12}SiO_{20}$ monocrystal 232c which is illuminated by the blue light exhibits photoconductivity and, thereby, causes migration of charges to cancel the double refraction state. Therefore, if the filter 236 is formed with a suitable mask configuration, that part of the monocrystal 232c which is not illuminated by the blue light to develop double refraction will constitute an aperture. In this case, the danger heretofore experienced at the time of mask replacement is eliminated because the mask is not located in the laser light path.

After the formation of the aperture, the laser 1 is caused to emit laser light. Preferably, the laser light is red light to which the $Bi_{12}SiO_{20}$ monocrystal shows low sensitivity and, optimumly, it is the light emanating from a YAG laser which emits infrared light. As the laser light is incident to the monocrystal 232c, its part transmitted through that portion of the monocrystal 232 which is in the double refraction state is rotated 90 degrees in the plane of polarization and, thereby, transmitted through the beam splitter 231. The light output from the beam splitter 231 has a section which is identical in shape with the machining pattern.

To completely erase the aperture defined in the light valve 232, i.e. the double refraction state, a xenon flash lamp 235 is turned on to illuminate the light valve 232 via a lens 234. The monocrystal 232c is exposed to the blue component of the light emanating from the xenon flash lamp 235, so that its double refraction state is cancelled.

In the fifth embodiment described above, the transparent electrodes 232a and 232e are in the form of ordinary flat electrodes and the mask controller 6a adapted to form an aperture is constructed to cause blue light to illuminate the light valve 232 from the back. In an alternative construction available for forming an aperture, a plurality of transparent electrodes 232a may be arranged parallel in the transverse direction, and a plurality of parallel transparent electrodes 232e in the vertical direction. In such an alternative construction, the matrix electrode made up of the transverse electrodes 232a and vertical electrodes 232e will be driven to apply an electric field to a liquid crystal to develop an electrooptical effect in the $Bi_{12}SiO_{20}$ monocrystal 232c. For example, one line of the transverse electrodes 232a is applied with the ground level while the others are opened. Meanwhile, a signal having a predetermined voltage is applied to all the vertical electrodes 232e at the same time; the voltage is substantially the same as the voltage applied to the flat electrodes 232a and 232e. For the method which generates an aperture by means of matrix electrode drive, the mercury lamp 239, lens 238, shutter 237 and filter 236 shown in FIG. 10 are needless.

Where the matrix electrode of the light valve 232 is configured and arranged such that one line of electrodes is several hundreds of microns wide and the adjacent electrodes are spaced by about several tens of microns, several hundreds of resolving points are attainable for the $Bi_{12}SiO_{20}$ monocrystal on the electrode line which is 10-30 millimeters long. Therefore, even if the laser beam transmitted through the beam splitter is reduced in size to 1/10 before reaching a sample, laser machining with sufficiently high resolution will be achieved. Since the resolution of the $Bi_{12}SiO_{20}$ monocrystal per se is on the order of several microns achieving, the above number of resolving points is no problem. Further, concerning the application of this embodiment to laser machining which deals with semiconductor wafers and photomasks, if a laser 1 having energy on the order of 1 joules per pulse is selected and the laser beam emanating from such a laser 1 is expanded by the beam expander 210 to a diameter of about 20 millimeters, the expanded laser beam will have an energy density of about 300 millijoules per square centimeter which is low enough to eliminate damage to the light valve 232. Meanwhile, a $Bi_{12}SiO_{20}$ light valve, due to its memory function, allows laser machining to be effected repeatedly as desired after the matrix electrode is driven once. Additionally, it is possible to form in the $Bi_{12}SiO_{20}$ light valve 232 an aperture having any desired configuration or to form other patterns in numerous positions at the same time.

In summary, it will be seen that the present invention facilitates formation of an aperture for attaining a desired machining shape, eliminates troublesome handling and the danger involved in changing the desired shape, and thereby features excellent mass-productivity. It will also be seen that, allowing an aperture to be calibrated from outside and making a microcomputer usable for the control over the calibration, the present invention extends the applicable range of a laser machining device while increasing the machining speed.

What is claimed is:

1. A laser machining apparatus, comprising:
   a marking table for supporting a workpiece which is to be laser engraved;
   laser means for generating a laser beam for engraving a workpiece on said marking table;
   a first optical system for converting said laser beam into a parallel laser beam;
   means for generating a transparent optical aperture of arbitrary pattern, said optical aperture generating means including a liquid crystal light valve controllable by an electrical or optical signal such that said optical aperature is controllable in pattern;
   means for directing the parallel laser beam output from the first optical system onto said liquid crystal light valve; and
   a second optical system for imaging the optical aperture generated by said liquid crystal light valve means onto said workpiece, whereby said parallel laser beam passed by said optically transparent aperture engraves said workpiece in said pattern.

2. A laser machining apparatus as claimed in claim 1, in which the optical aperture generating means further comprises polarization separating means responsive to polarization of said parallel laser beam for separating an undesired, polarized component from said parallel laser beam, and control means for controlling said light valve.

3. A laser machining apparatus as claimed in claim 2, in which the light valve comprises a first glass substrate having a first transparent electrode and a first liquid crystal orienting film, and a second glass substrate having a second transparent electrode, a photoconductive film, a light intercepting film, a reflecting film for reflecting the laser beam, and a second liquid crystal orienting film which are sequentially arranged in the foregoing order, a cell arranged such that said first and second liquid crystal orienting films set up directions of orientation which are angled 45 degrees to each other, and a twisted nematic liquid crystal filled in the cell.

4. A laser machining apparatus as claimed in claim 3, in which the control means comprises a cathode ray tube for displaying at least one of necessary characters and figures, means for controlling said cathode ray tube, and an optical system for imaging a picture on the cathode ray tube to the cell.

5. A laser machining apparatus as claimed in claim 2, in which the light valve comprises a first glass substrate having a first transparent electrode and a first liquid crystal orienting film, and a second glass substrate having transverse electrodes, vertical electrodes, a reflecting film for reflecting the laser light, and a second liquid crystal orienting film which are sequentially arranged in the foregoing order, a cell arranged such that the first and second liquid crystal orienting films set up directions of orientation which are parallel to each other, and an n-type cholesteric liquid crystal filled in the cell.

6. A laser machining apparatus as claimed in claim 5, in which a polarization characteristic of the liquid crystal is controlled by heat which is generated at intersecting points of the matrix electrode which is made up of transverse and vertical electrodes.

7. A laser machining apparatus as claimed in claim 2, in which the light valve comprises a first glass substrate having transparent transverse electrodes and a first liquid crystal orienting film, a second glass substrate having vertical electrodes, a reflecting film for reflecting the laser light, a second liquid crystal orienting film which are sequentially arranged in the foregoing order, a cell arranged such that the first and second orienting films have directions of orientations which are perpendicular to each other, and a p-type cholesteric liquid crystal filled in the cell.

8. A laser machining apparatus as claimed in claim 7, in which a polarization characteristic of the liquid crystal is controlled by varying an electric field applied to the liquid crystal by supplying drive signals to the transverse and vertical electrodes.

9. A laser machining apparatus as claimed in claim 2, in which the light valve comprises a first glass substrate having vertical electrodes and a first liquid crystal orienting film, a second glass substrate having transverse electrodes and a second liquid crystal orienting film, a cell arranged such that the first and second orienting films have directions of orientation which are perpendicular to each other, and a twisted nematic liquid crystal filled in said cell.

10. A laser machining apparatus as claimed in claim 9, in which a polarizing characteristic of the liquid crystal is controlled by varying an electric field applied to the liquid crystal by appling drive signals to the transverse and vertical electrodes.

11. A laser machining device as claimed in claim 10, in which the polarization separating means is disposed at the rear of an optical path through which the laser light transmitted through the light valve propagates.

12. A laser machining apparatus as claimed in claim 2, in which the light valve comprises an electrooptical crystal, and a first transparent electrode and a second transparent electrode which are positioned respectively on opposite ends of said electrooptical crystal.

13. A laser machining apparatus as claimed in claim 1, further including keyboard means for entering character, numeral and symbol information, and controller means responsive to entered character, numeral and symbol information for providing said electrical or optical signal to said liquid crystal light valve to develop said transparent aperture.

* * * * *